(12) United States Patent
Ho et al.

(10) Patent No.: US 7,865,572 B2
(45) Date of Patent: *Jan. 4, 2011

(54) METHOD AND APPARATUS FOR TRANSFERRING DIGITAL CONTENT FROM A PERSONAL COMPUTER TO A MOBILE HANDSET

(75) Inventors: Edwin Ho, Palo Alto, CA (US); King Sunit Wai, Fremont, CA (US)

(73) Assignee: MSPOT, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/355,546

(22) Filed: Jan. 16, 2009

(65) Prior Publication Data

US 2009/0247066 A1    Oct. 1, 2009

Related U.S. Application Data

(63) Continuation-in-part of application No. 11/788,711, filed on Apr. 20, 2007.

(60) Provisional application No. 61/040,131, filed on Mar. 27, 2008, provisional application No. 60/879,416, filed on Jan. 8, 2007.

(51) Int. Cl.
   *G06F 15/16*  (2006.01)

(52) U.S. Cl. .................. 709/217; 709/231; 709/233

(58) Field of Classification Search .............. 455/414.1, 455/556.1, 556.2, 557, 566; 709/217, 231, 709/233

See application file for complete search history.

(56) References Cited

U.S. PATENT DOCUMENTS

| 6,493,758 | B1 | 12/2002 | McLain |
| 6,507,727 | B1 * | 1/2003 | Henrick ..................... 455/3.06 |
| 6,795,859 | B2 | 9/2004 | Parker |
| 6,810,080 | B1 | 10/2004 | Wise |
| 7,136,934 | B2 | 11/2006 | Carter et al. |
| 7,191,193 | B2 | 3/2007 | Ben-Yaacov et al. |
| 7,281,034 | B1 | 10/2007 | Eyal |
| 7,403,769 | B2 * | 7/2008 | Kopra et al. ............. 455/414.1 |
| 7,523,136 | B2 * | 4/2009 | Toorn ................................ 1/1 |
| 2002/0002039 | A1 | 1/2002 | Qureshey et al. |
| 2005/0015467 | A1 | 1/2005 | Noda |
| 2005/0044235 | A1 | 2/2005 | Balahura et al. |
| 2006/0008180 | A1 | 1/2006 | Wakeland |
| 2006/0143297 | A1 | 6/2006 | Korhonen et al. |
| 2006/0173974 | A1 | 8/2006 | Tang |

(Continued)

FOREIGN PATENT DOCUMENTS

WO    WO 2004/061547 A2    7/2004

(Continued)

OTHER PUBLICATIONS

PCT/US08/00055, International Search Report, dated Apr. 10, 2008.

(Continued)

*Primary Examiner*—Temica M Beamer
(74) *Attorney, Agent, or Firm*—DLA Piper LLP (US)

(57) ABSTRACT

A system for synchronizing digital content stored on a user's mobile handset with digital content stored on the user's personal computer is disclosed.

54 Claims, 8 Drawing Sheets

U.S. PATENT DOCUMENTS

| | | |
|---|---|---|
| 2006/0206565 A1 | 9/2006 | Ganesan |
| 2006/0288847 A1 | 12/2006 | Gould et al. |
| 2008/0010372 A1 | 1/2008 | Khedouri et al. |
| 2008/0022005 A1 | 1/2008 | Wu et al. |

FOREIGN PATENT DOCUMENTS

| | | |
|---|---|---|
| WO | WO 2005/064945 | 7/2005 |
| WO | WO 2005/106876 A2 | 11/2005 |
| WO | WO 2005/109224 | 11/2005 |
| WO | WO 2006/019608 A1 | 2/2006 |
| WO | WO 2006/058149 A2 | 6/2006 |
| WO | WO 2008/070062 A2 | 6/2008 |

OTHER PUBLICATIONS

PCT/US08/00055, Written Opinion, dated Apr. 10, 2008.
EP 08 70 5466 Supplementary European Search Report dated Feb. 23, 2010.
EP 08 70 5466 Office Action dated Jun. 10, 2010 (4 pgs.).
PCT/US2009/038457 International Search Report dated Aug. 27, 2009.
PCT/US2009/038457 Written Opinion dated Aug. 27, 2009.

* cited by examiner

METHOD AND APPARATUS FOR TRANSFERRING DIGITAL CONTENT FROM A PERSONAL COMPUTER TO A MOBILE HANDSET

PRIORITY CLAIMS

This application claims the benefit under 35 USC 119(e) to U.S. Provisional Patent Application Ser. No. 61/040,131 filed on Mar. 27, 2008 and entitled "Method And Apparatus For Transferring Digital Content From A Personal Computer To A Mobile Handset" and also claims priority under 35 USC 120 and is a continuation in part to U.S. patent application Ser. No. 11/788,711 filed on Apr. 20, 2007 and entitled "Method And Apparatus For Transferring Digital Content From A Personal Computer To A Mobile Handset" which in turn claims priority under 35 USC 119(e) and 120 to U.S. Provisional Patent Application Ser. No. 60/879,416 filed on Jan. 8, 2007, both of which are incorporated by reference herein.

FIELD

The invention relates generally to a method and apparatus for transferring digital content stored on a user's personal computer to the user's mobile handset.

BACKGROUND

With the increase in storage capacity of hard disk drives and the prevalence of optical CD and DVD drives, users now can store their entire musical libraries on their personal computer (PC). For example, various software programs such as iTunes (offered by Apple Computer) allow a user to load musical content from CDs, store it on the computer's hard disk drive, organize the different content, and then play the music on the PC or burn all or part of the musical collection onto a CD or DVD. Users also can transfer the musical files to other devices, such as an iPod (offered by Apple Computer) or an MP3 player. These transfers typically require a direct, hardwired connection between the PC and the device, such as through a USB cable.

In recent years, mobile handsets (such as cellular phones and PDAs) have evolved beyond mere telephone and data collection devices. For example, many cellular phones now have sophisticated display screens and audio capabilities. Various companies (including mSpot, Inc., the assignee of this application), offer audio and video content that is "streamed" to the cellular phone using a wireless cellular network. This allows cellular phone users to listen to music or other audio content and watch movies or other video content on their cellular phones. However, the user's choices are limited to the content offered by the provider.

What is needed in the art is a system that allows a user of a mobile handset to obtain digital content that he or she previously had stored on a personal computer or other device by downloading the content over a wireless network and to store it on the mobile handset.

What is further needed is the ability to synchronize the digital content as well as the file structure, user ratings, and other metadata between the mobile handset and PC.

DETAILED DESCRIPTION OF ONE OR MORE EMBODIMENTS

Figure 1:
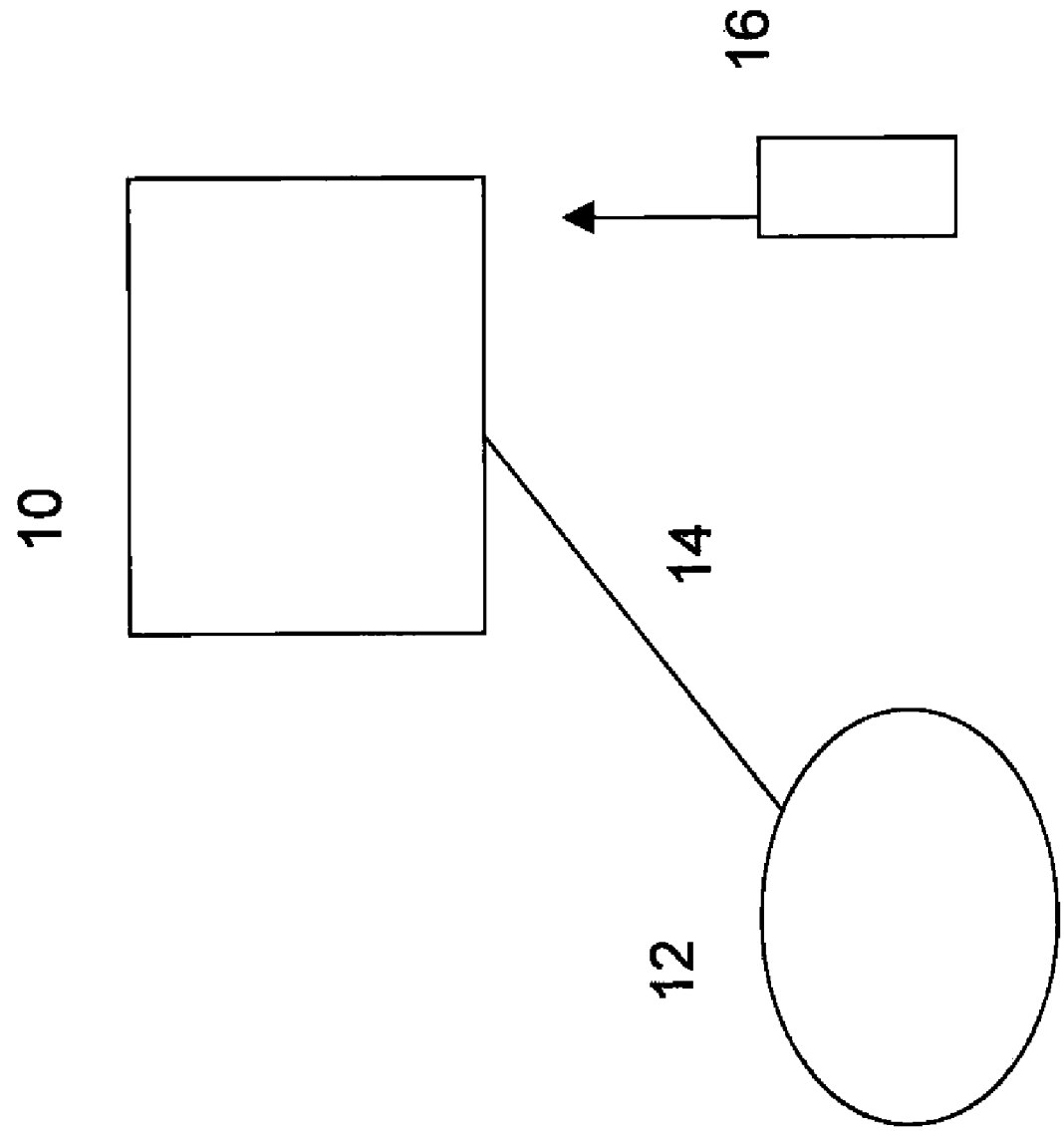
FIG. 1 is a block diagram of the prior art system involving a PC and an audio device such as an iPod or MP3 player and/or a portable storage device.

FIG. 1 depicts the prior art system in which a user stores digital content (such as music, video, etc.) on computer 10. Computer 10 can be a desktop, notebook, server, or any other type of device that can store digital data. User connects portable entertainment device 12 to computer 10 using interface 14. Portable entertainment device 12 can be an iPod, MP3 player, or any other device that can store and play digital content. Interface 14 is a direct connection between computer 10 and portable entertainment device 12 and typically is a USB cable or Firewire cable.

In the alternative, a user can connect portable storage device 16 to computer 10 to download the digital data, and then disconnect portable storage device 16 from computer 10 and then connect portable storage device 16 to portable entertainment device 12 to download the data onto portable entertainment device 12. Portable storage device 16 can be a Flash ROM chip, a hard disk drive, or other storage device.

Figure 2:
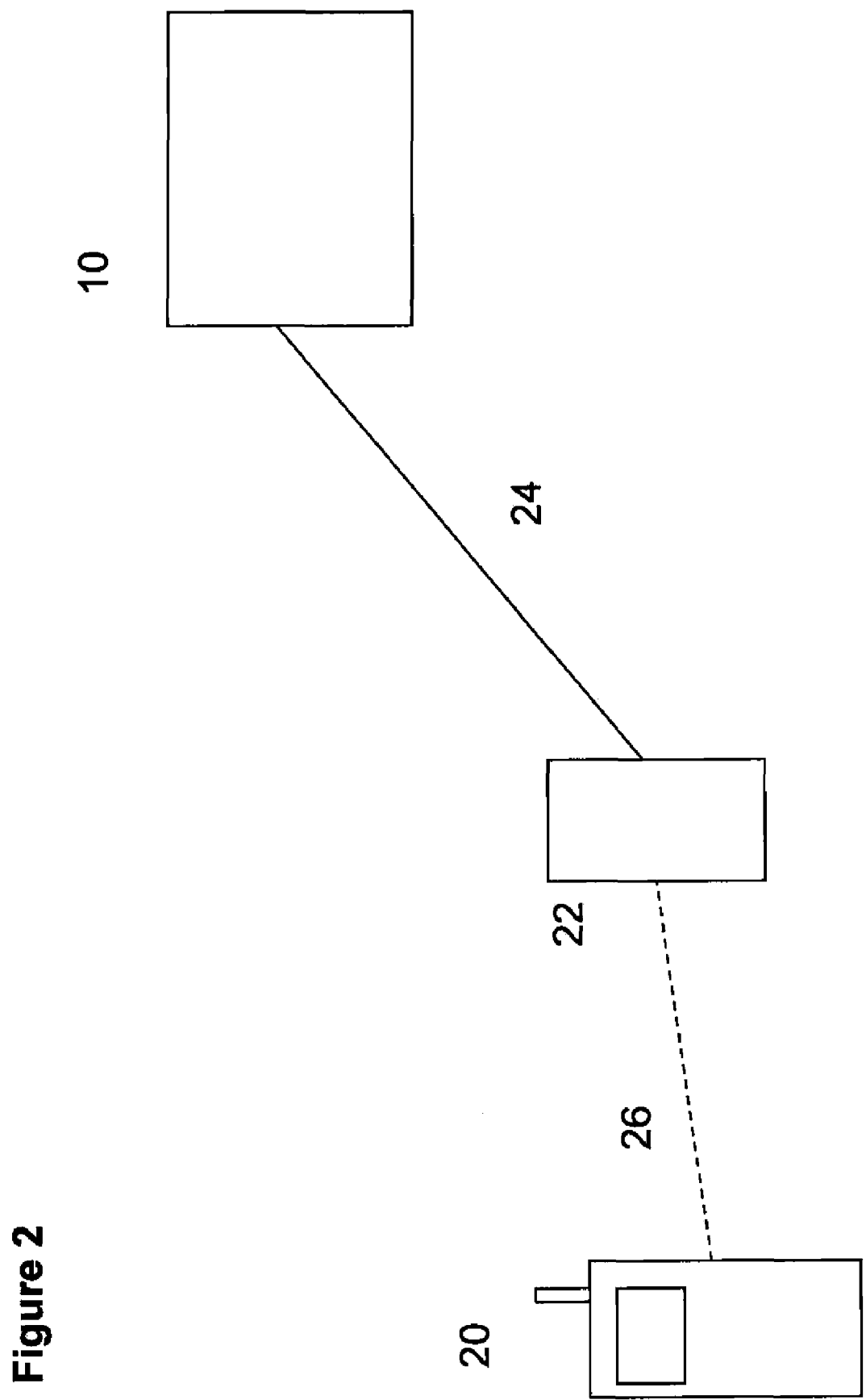
FIG. 2 illustrates a system that allows a mobile handset to download music from a PC using a wireless network and the Internet.

FIG. 2 depicts a system that allows a mobile handset to download digital content from a computer using a wireless network. As in the prior art, a user stores digital content (such as music, video, etc.) on computer 10. However, in this embodiment, the user downloads the digital data from computer 10 to mobile handset 20 in a wireless fashion over a wireless communication path. Mobile handset 20 may be a PDA, mobile phone, wireless email device (such as the Blackberry), or other handheld device that has wireless connectivity to be able to communicate with the computer 10 and download digital content from the computer 10. Computer 10 communicates with a device 22, such as a server computer, over network 24. Network 24 can be any type of network, such as the Internet, and can be hardwired, wireless, or some combination of the two. Computer 10 runs a software application that allows a user to catalog and organize the digital content of the user. The device 22 can be accessible over the Internet (such as through a URL address). The device 22 is shown in FIG. 2 as a single device. However, it is to be understood that the device 22 can instead comprise multiple devices, such as multiple servers.

Mobile handset 20 connects to device 22 over a wireless network 26. Wireless network 26 can be a cellular telephone network, a WiFi network (such as an 802.11 network), a wireless data network (such as EV-DO or EDGE), or any other wireless network. It is to be understood that wireless network 26 need not connect directly to server device 22, but instead can connect through an indirect means such as by the Internet or through another network. The embodiment will be further described with reference to FIG. 3.

Figure 3:
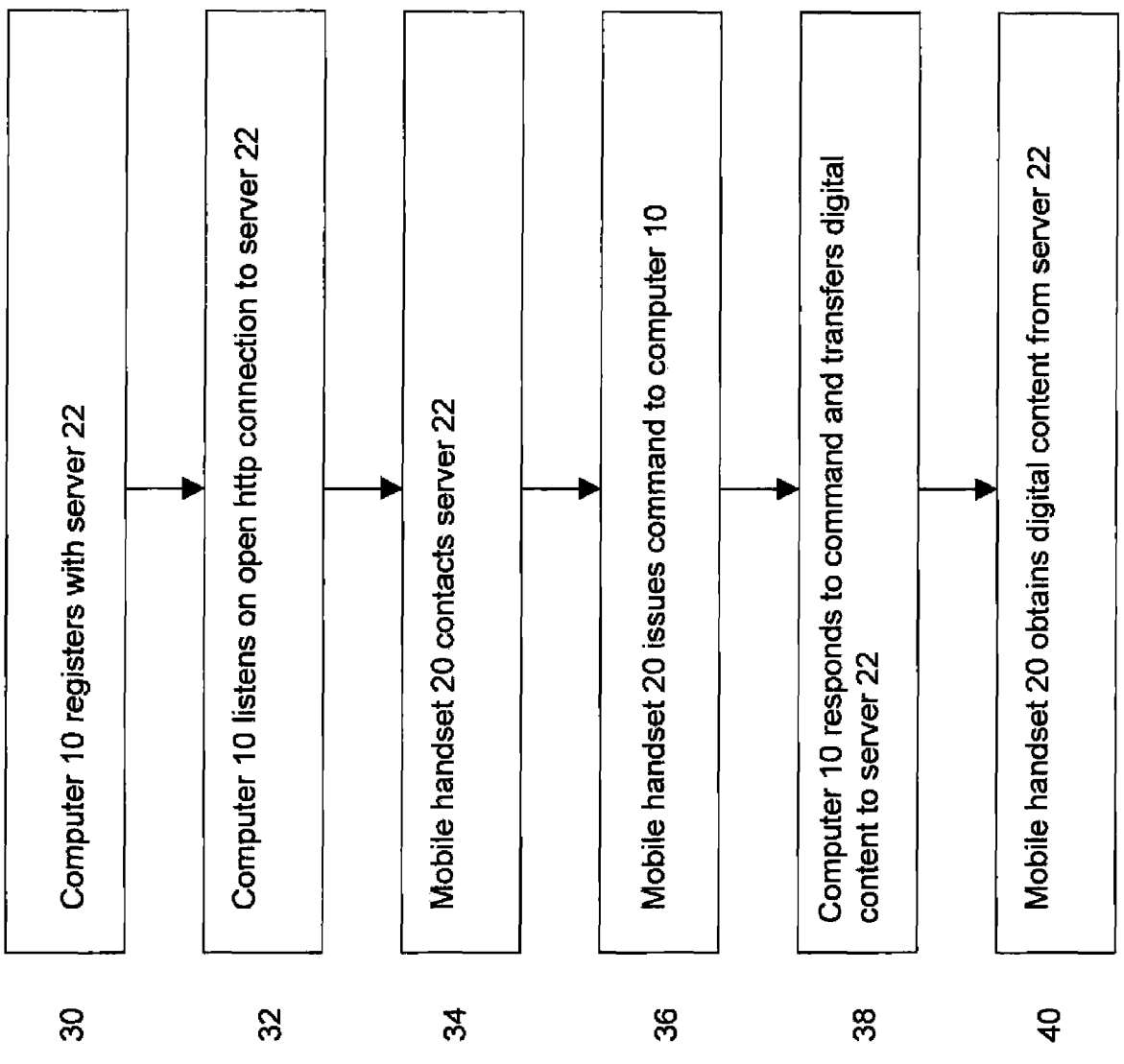
FIG. 3 is a flowchart showing a method for downloading music from a PC to a mobile handset.

FIG. 3 is a flowchart depicting the interaction of the various elements shown in FIG. 2. Computer 10 connects to device 22 over network 24. Computer 10 then registers with device 22 (30) so that device 22 associates the digital content in the computer 10 with a particular user and a particular mobile handset. Computer 10 then listens on an open http connection to device 22 (32) and waits for communications from server device 22. Mobile handset 20 contacts server device 22 (34) over wireless network 26. Once the computer 10 is registered with the device 22, the user of the mobile handset, when the handset is turned on, sees the digital content actually stored on the mobile handset as well as the digital content stored in the computer 10 in a single display as shown in more detail in FIG. 4. When the user of the mobile handset wants to use a piece of digital content stored on the computer 10, the mobile handset 20 issues a command to computer 10 (36), such as a command to transfer a certain piece of digital content. Computer 10 responds to the command and transfers the digital content to device 22 (38). Mobile handset 20 then obtains digital content from device 22 (step 40). Thus, mobile handset 20 is able to obtain digital content (such as a music file) from computer 10 in a fashion that is at least partly wireless. Using the above system and method, a user may have digital content stored on his/her computer as well as on the mobile handset and may synchronize the digital content between the computer and the mobile handset in a wireless manner. For example, the system permits a user to have a much larger digital content catalog available for use than can be stored in the mobile handset. In addition, the system permits the user to download particular digital content at any time, such as downloading a particular movie before a long airplane flight. The user also can download additional data associated with the digital content, such as metadata (artist information, duration, title, etc.), cover art, and other data.

Figure 4:
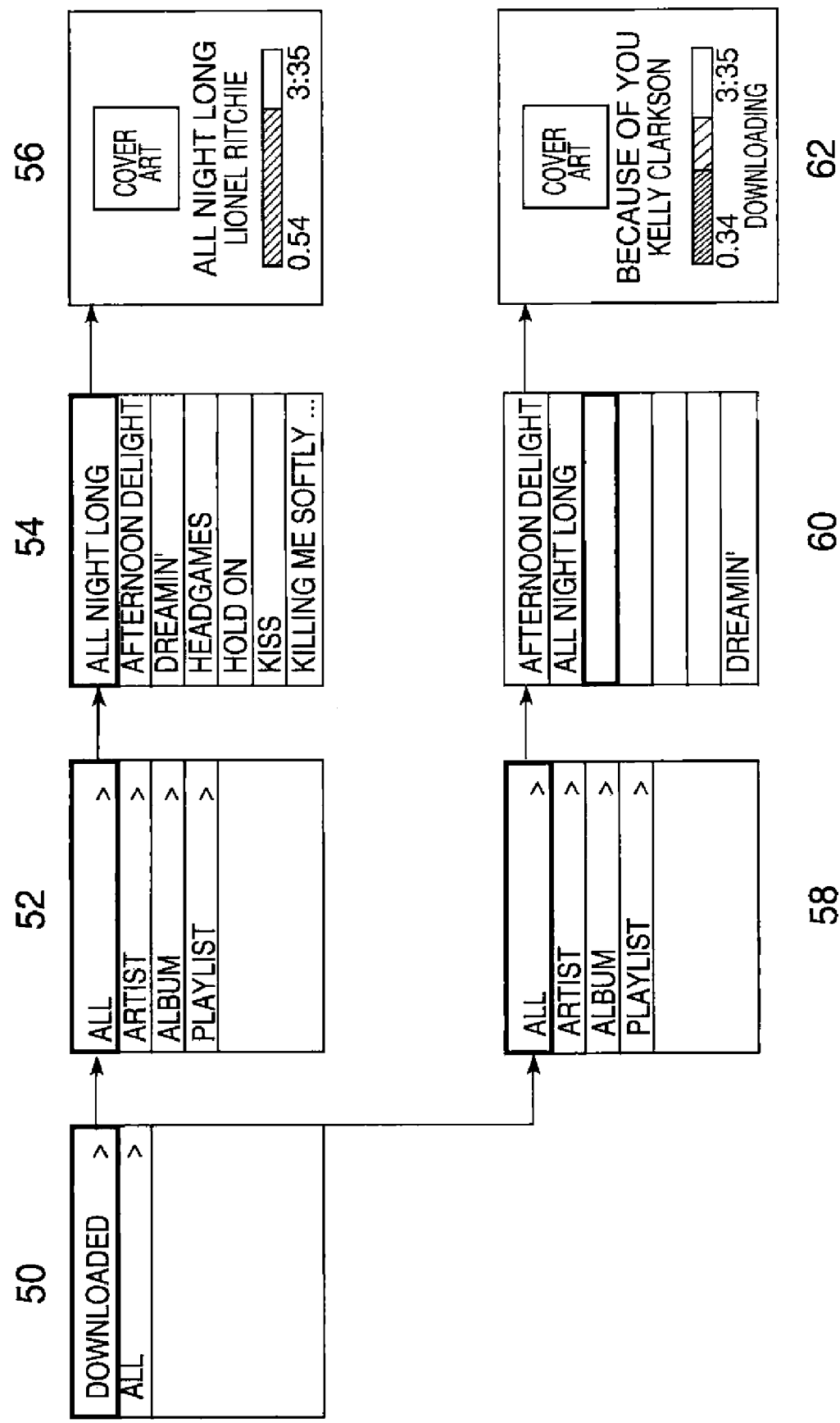
FIG. 4 shows an example of a user interface on the mobile handset for downloading music from a PC to the mobile handset.

FIG. 4 shows an embodiment of a user interface for mobile handset 20 once the computer 10 is registered with the device 22. FIG. 4 shows a number of different screens that might be displayed on mobile handset 20. These screens are generated by a software application running on mobile handset 20. The software application on the mobile handset obtains (when the digital content is not already stored in the mobile handset), organizes, displays (both digital content on the mobile handset and the computer 10), stores and plays digital content and can generate the user interface described below.

Screen 50 provides the user with two choices—to view a list of files that have been downloaded from computer 10 ("Downloaded") and are stored on the mobile handset, or to view a list of all files ("All") including the digital content stored on the mobile handset and the digital content stored on the computer 10. If the user selects the "Downloaded" option, then in screen 52, the user can then choose a subset of the files (by artist, album, or playlist) or to view all of them. If the user selects "All," then mobile handset 20 displays all available music files, including files that have been or can be downloaded from computer 10. In this embodiment, song titles in normal, black text already have been downloaded to mobile handset 20, and song titles in gray text have not yet been downloaded but can be downloaded. In Screen 54, the user selects the song "All Night Long," which already has been downloaded, and in Screen 56, the song plays on mobile handset 20 while cover art and other relevant information is displayed for the song "All Night Long."

When the user selects the "All" option in screen 50, the user is presented with a menu (58) that permits the user with options to view all of the digital content (both stored on the mobile handset and stored on the computer) including "All", by Artist, by Album and/or by Playlist. When the user selects to view all of the digital content (which are songs in this example), a screen 60 shows all of the digital content (both on the mobile handset and on the computer) wherein certain pieces of digital content are shown in gray text indicating that those pieces of digital content are stored on the computer and are available for download to the mobile handset and other pieces of digital content are shown in black indicating that those pieces of digital content are stored on the mobile handset. If the user selects "Because of You" (which is shown in gray text), mobile handset 20 then issues a command to computer 10 (36), such as a command to transfer the song "Because of You" from the computer to the mobile handset. Computer 10 responds to the command and transfers the requested digital content to server device 22 (38) and the mobile handset 20 then obtains the digital content from server device 22 (40). Once the piece of digital content (or at least a buffer full of the piece of digital content as the piece of digital content continues to download in the background) is downloaded to the mobile handset, screen 62 then shows the cover art and other relevant information for the song "Because of You" as the song is being played. When the digital content is downloaded onto mobile handset 20, it is played on mobile handset 20 and is also stored in a storage system within mobile handset 20 (such as on Flash RAM chip or disk drive) while it is being played. The digital content (a song in the example in FIG. 4) is thus added to the music collection stored on mobile handset 20. When that song is displayed in a menu in the future, it will be displayed in normal, black text rather than gray text since it has now been downloaded and stored on mobile handset 20.

In this manner, the digital content on mobile handset 20 can be synchronized with the digital content on computer 10 in a wireless fashion. This allows a user to listen to or watch the digital content that is stored on computer 10, even when the user is in a location remote from the computer 10.

Device 22 can implement security or verification measures to ensure that the person operating mobile handset 20 is the same person who owns computer 10, for copyright protection and other reasons. For example, device 22 can require that computer 10, when the computer registers with the device 22, provide device 22 with the phone number for the mobile handset that will be allowed to access the digital content stored on computer 10. When mobile handset 20 then contacts device 22 with a request to obtain data from computer 10, device 22 can then determine if the phone number associated with mobile handset 20 is the same phone number that previously had been registered by computer 10. Device 22 can be designed to proceed with the requested transfer only if the two phone numbers match. Other security or verification measures can be implemented, and this example is only illustrative.

Mobile handset 20 may include circuitry for running an operating system and applications, circuitry for processing data and metadata, and circuitry for rendering and playing the digital content, such as audio content and video content. All of the circuitry can be contained in a single integrated chip, in multiple integrated chips, or in a combination of some number of integrated chips and other electronic components.

A user of mobile handset 20 can run various applications on the handset, such as an application that enables the user to listen to music or to watch video content. Mobile handset 20 can include a video display and a speaker, which would enable a user of mobile handset 20 to watch video content on the video display and listen to audio content through the speaker.

Figure 5:
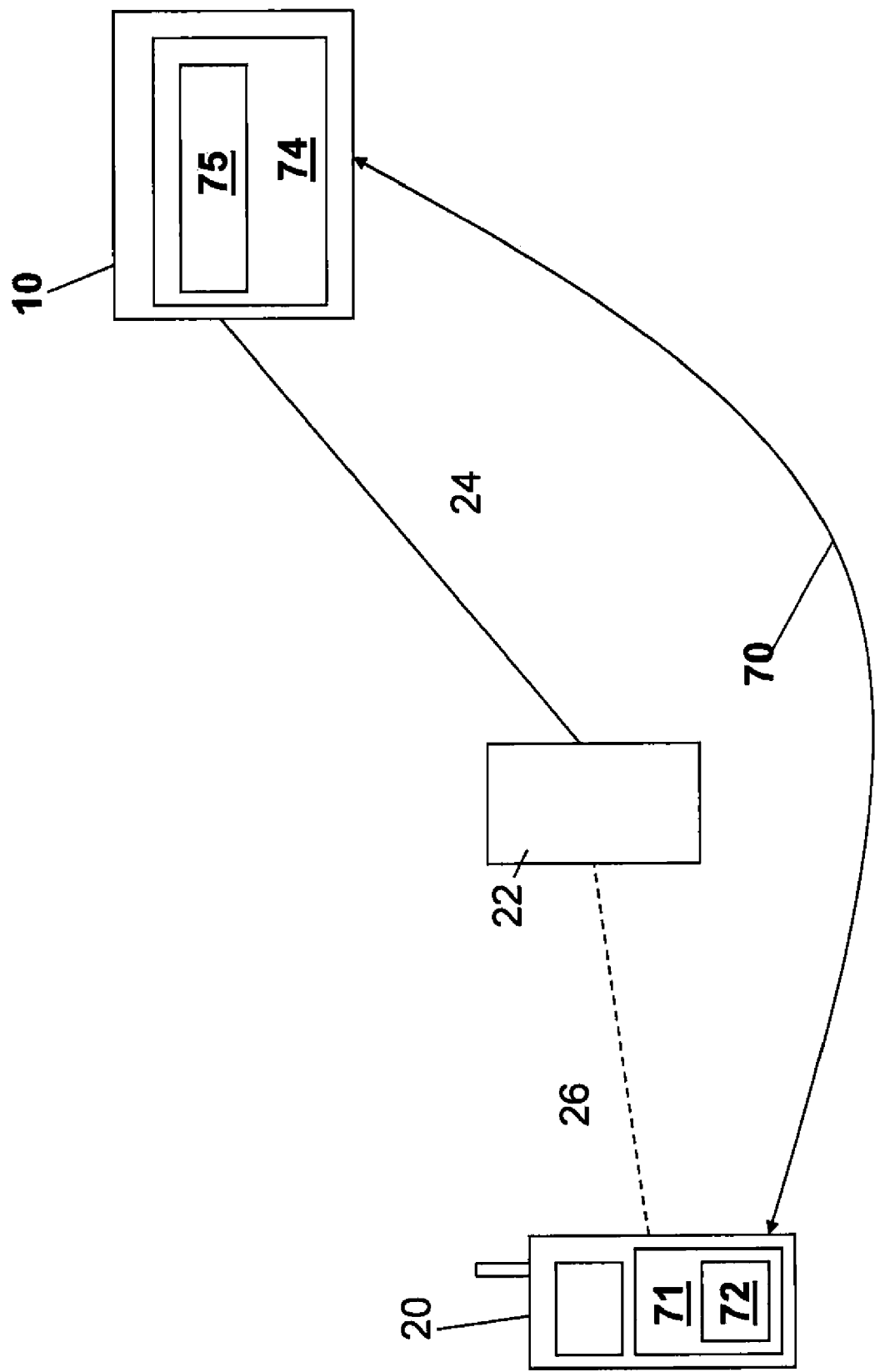
FIG. 5 illustrates another embodiment of the system that allows a mobile handset to share content with a computing device.

FIG. 5 illustrates another embodiment of the system that allows a mobile handset 20 to share content with a computing device 10. In this embodiment, the mobile handset 20 can share content with the computing device 10 through the device 22 (as described above), but may also share content/synchronize content with the computing device 10 over a link 70, such as a cable, a docking station, by removing a memory card from the mobile handset 20 and reading the memory card using a memory card reading device coupled to the computing device 10 or by other wireless protocols such as a Bluetooth network. In this embodiment, the synchronization of the content over the two different methods (through the device 22 and over the link) requires that the system tracks the synchronization by both methods. The system may also permit multiple computing devices and multiple handsets (assuming that the user has the proper authorizations to share the content) to share the content.

The mobile handset may include a content store 71, such as a database, that may include one or more playlists 72 and the computing device 10 may a content store 74, such as a database, and one or more pieces of content 75. In the computing device 10, the one or more pieces of content may have a plurality of different formats (such as MP3, AAC, ACC+, m4a for music content) and the system may be used with multiple different types of content including music content, photo content, file content, video content, podcasts and any other type of digital content. The computing device, using the content store 74, identifies any new content files so that those new content files can appear in the user interface of the mobile handset described above and new files downloaded directed to the mobile handset appear in the master content store maintained on the computing device 10. The content store 71 on each mobile handset may include an identification code (ID) so that the computing device 10 may contain a plurality of content stores for a plurality of mobile handsets wherein the content stores for each mobile handset are distinguished by the identification code. A user can also create a new playlist on the mobile handset that is stored in the content store 71 and then is synchronized back to the computing device 10 so that the computing device also maintains the playlists for the particular mobile handset in the content store for that particular mobile handset as identified by the identification code.

In the system and method described above, the playlists generated on the mobile handset may be an on-the-fly playlist which allows content (both local to the mobile handset and the computing device 10 as well content from any source that can be later pulled down to the mobile handset) to be stored into a playlist on the mobile handset. As above, the on-the-fly playlist may be synchronized back to the computing device 10. In addition, when content stored on the computing device changes (content is removed, for example or the user no longer has rights to play a particular piece of content), the on-the-fly playlist (and other playlists on the mobile handset) are automatically updated to reflect those changes. Thus, when a piece of content is added to the playlist or removed from the playlist or mobile handset or computing device 10 or the owner of the mobile handset loses his/her rights to the piece of content, the playlist stored in the memory of the mobile handset is automatically updated to reflect the changes.

Figure 6:
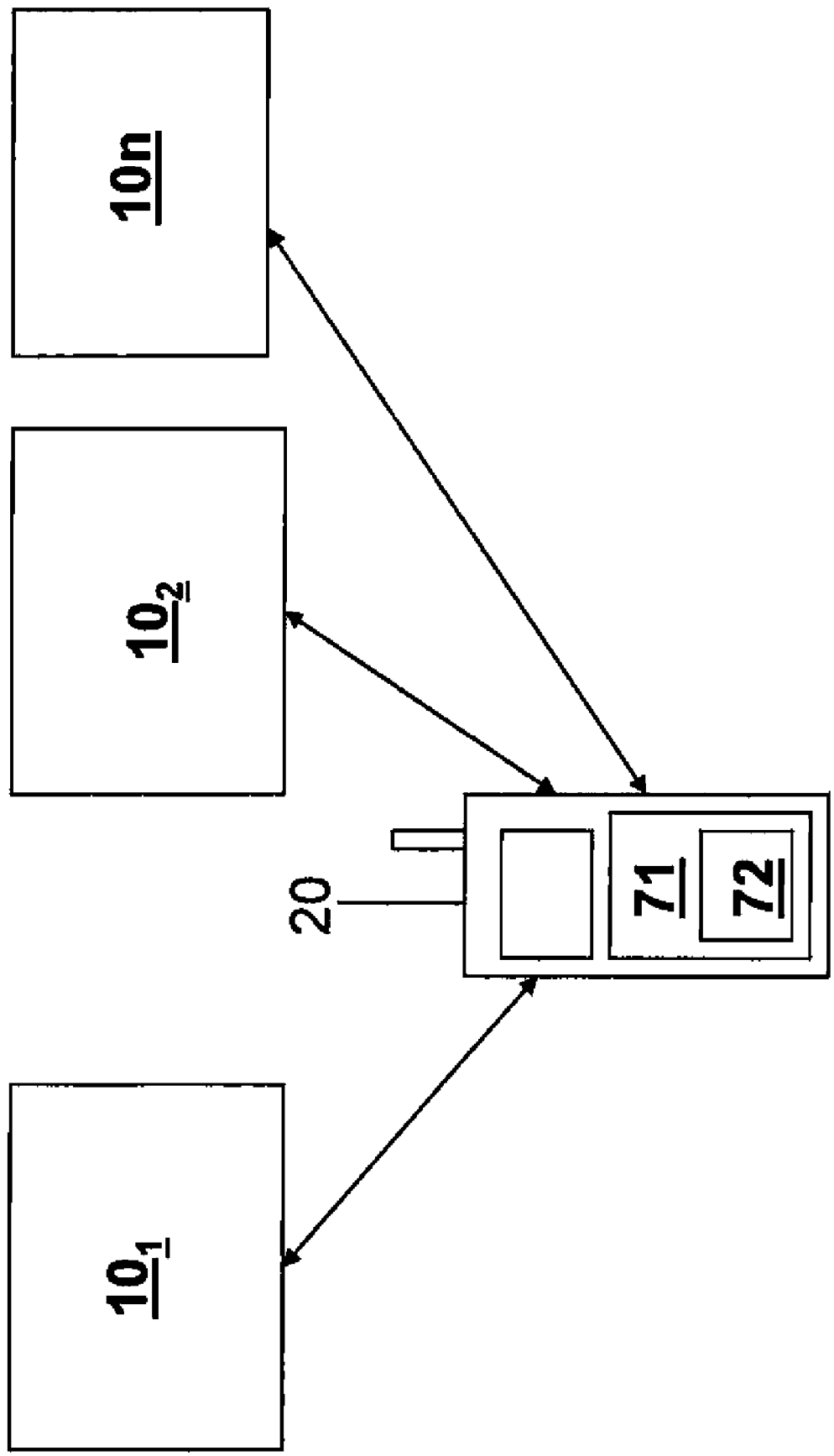
FIG. 6 illustrates another embodiment of the system that allows a mobile handset to share content among a plurality of computing devices.

FIG. 6 illustrates another embodiment of the system that allows a mobile handset 20 to share content among a plurality of computing devices wherein the mobile handset has the content store 71 and playlists 72. As shown, the system permits the mobile handset 20 to synchronize its content with a plurality of computing devices $10_1, 10_2, \ldots, 10n$ and each computing device maintains a content store of the content on the mobile handset. For example, in a family in which the different family members each have their own computing device, the mobile handset of a particular family member can be synchronized to the multiple computing devices so that the content purchased by each member of the family can be shared. Similarly, the system permits multiple mobile handsets to synchronize their content with a single computing device (such as might be the case of a family) or multiple mobile handsets can synchronize their content with multiple computing devices. Thus, the system permits the computing devices to effectively share content between the computing devices.

Figure 7A:
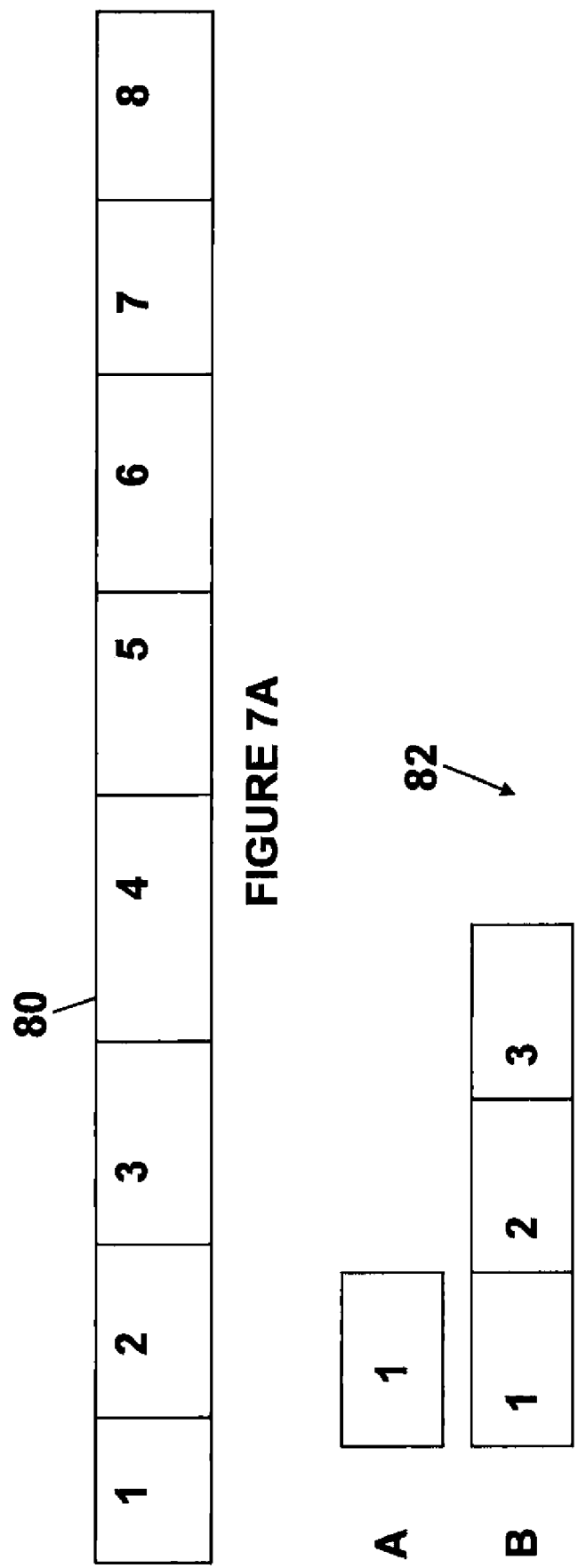
FIG. 7A illustrates a piece of content segmented into smaller pieces.

FIG. 7A illustrates a piece of content 80 segmented into smaller pieces. In most mobile handsets, it is not possible to download an entire piece of content (or the downloading of the entire content causes an unacceptable delay in the user experience) so that the piece of content is segmented into segments, such as segments 1-8, in order to download the segments to mobile handset. For example, the system is able to download the segments in sequential manner and therefore begin to play the piece of content prior to the entire piece of content being downloaded to the mobile handset that provides a better user experience. A mobile handset, depending on the type of mobile handset, may have a progressive download mode. In the progressive download mode, the mobile handset can start the download of the segments and then start to play the content while the remainder of the segments of the content are downloaded to the mobile handset. If the mobile handset is capable of progressive downloading, then the downloading of the content to the mobile handset is straight-forward. However, if the mobile handset does not support progressive downloading (which is the case for most mobile handsets such as mobile phones), a buffering method is used to permit the segmentation of the content and then the downloading of the segments of the content.

Figure 7B:
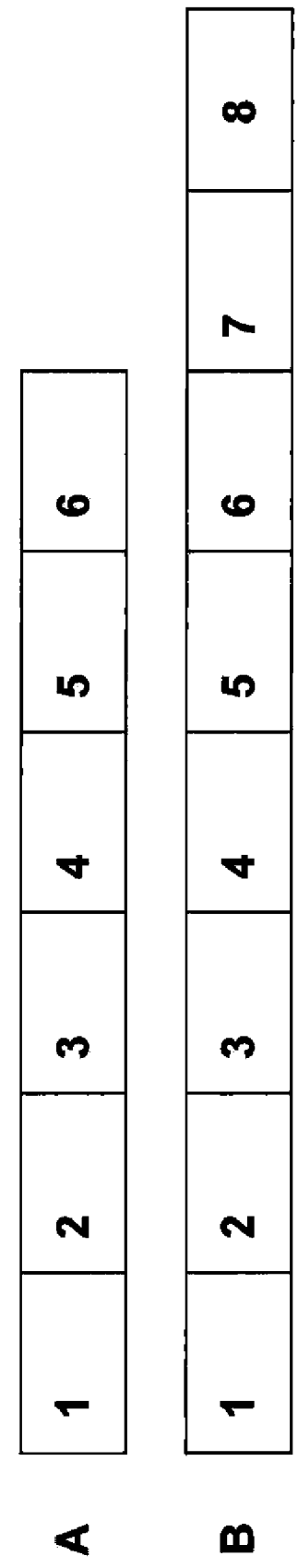
FIG. 7B illustrates a method for downloading content to a mobile device that does not support progressive downloading.

FIG. 7B illustrates a method for downloading/streaming content to a mobile handset that does not support progressive downloading. When the mobile handset does not support progressive downloading, the mobile handset does not permit any download into a buffer while any portion of the content is being played from the buffer. The mobile handset 20 includes the application, as described above, that manages the content on the mobile handset and displays the user interface shown in FIG. 4. In the embodiment in which the mobile handset does not support progressive downloading, the application may also segment a memory space of the mobile handset into a first buffer A and a second buffer B wherein the downloading of the segments of the content occurs by ping-ponging between the first and second buffers. In particular, as shown in FIG. 7B, a new piece of content (having segments 1-8 in this example) has its first segment downloaded into the first buffer and then the segment is played from the first buffer. While the segment of content is being played in the first buffer, the next segments of the piece of content (which must include the first segment to maintain the file integrity and download the file header) of the piece of content is downloaded to the second buffer B (segments 1-3 in this example). Then, when the first segment is completed, the content in the second buffer starting at segment 2 is played. During the switch from the first buffer to the second buffer, a 20 ms silence occurs but it is not noticeable by the user. As the segments of content are being played from the second buffer B, addition segments (segments 4-6 in this example) are downloaded to the first buffer A (along with the prior segments to maintain content file integrity and download the file header). When the playing of the second and third segments is completed, the mobile handset switches back to the first buffer A so that segments 4-6 can be played. While the segments in the first buffer A are being played, the last segments of the piece of content (along with the prior segments to maintain content file integrity) are downloaded into the second buffer and the mobile handset then plays the remaining segments from the second buffer once segments 4-6 are completed so that the mobile handset ping-pongs between the first and second buffers. The use of the two buffers results in a better user experience since the only silence gaps are approximately 20 ms gaps that are not noticeable by the user and permits streaming of the content. Without the two buffers, a mobile handset that does not support progressive downloading: 1) must wait to play the content until it is completely downloaded (which takes too long); or 2) introduces a pause (2 seconds or more) each time that the mobile handset needs to download the next segments of the content. In addition, a mobile handset that does not support progressive downloading and does not have the two buffers cannot be adaptive to bandwidth changes in the network and thus cannot take advantage of good network coverage and good network speed to provide a better user experience.

In another embodiment, the memory space of the mobile handset may be divided into the first and second buffers (as described above) and a third buffer wherein the segments of the content are downloading into the third buffer so that the third buffer has all of the currently downloaded segments of the content (or all of the segments of the content if the downloading is completed).

The mobile handset application may also include a mode in which the application, when the user is playing a playlist for example, looks ahead in the playlist and downloads the next piece of content in the playlist (if it is not already on the mobile handset) in a streaming manner wherein the first piece of content will have the 20 ms silence gaps (due to the streaming and ping-ponging between the buffers), but any subsequent pieces of content will not have the silence gaps since the subsequent content may be pre-downloaded in the entirety to the mobile handset.

The mobile handset/application of the mobile handset may also include an "airplane" mode in which the mobile handset and application determines when the mobile handset is connected to the network (either the wireless network or the link). When the application determines that the mobile handset does not have any connection to the computing device 10, the application does not display any content that is only on the computing device 10, but permits the user to play the content already stored on the mobile handset. However, when the mobile handset is again connected to the computing device 10, the content on the mobile handset and on the computing device (shown in FIG. 4 above) is again shown to the user.

Figure 8:
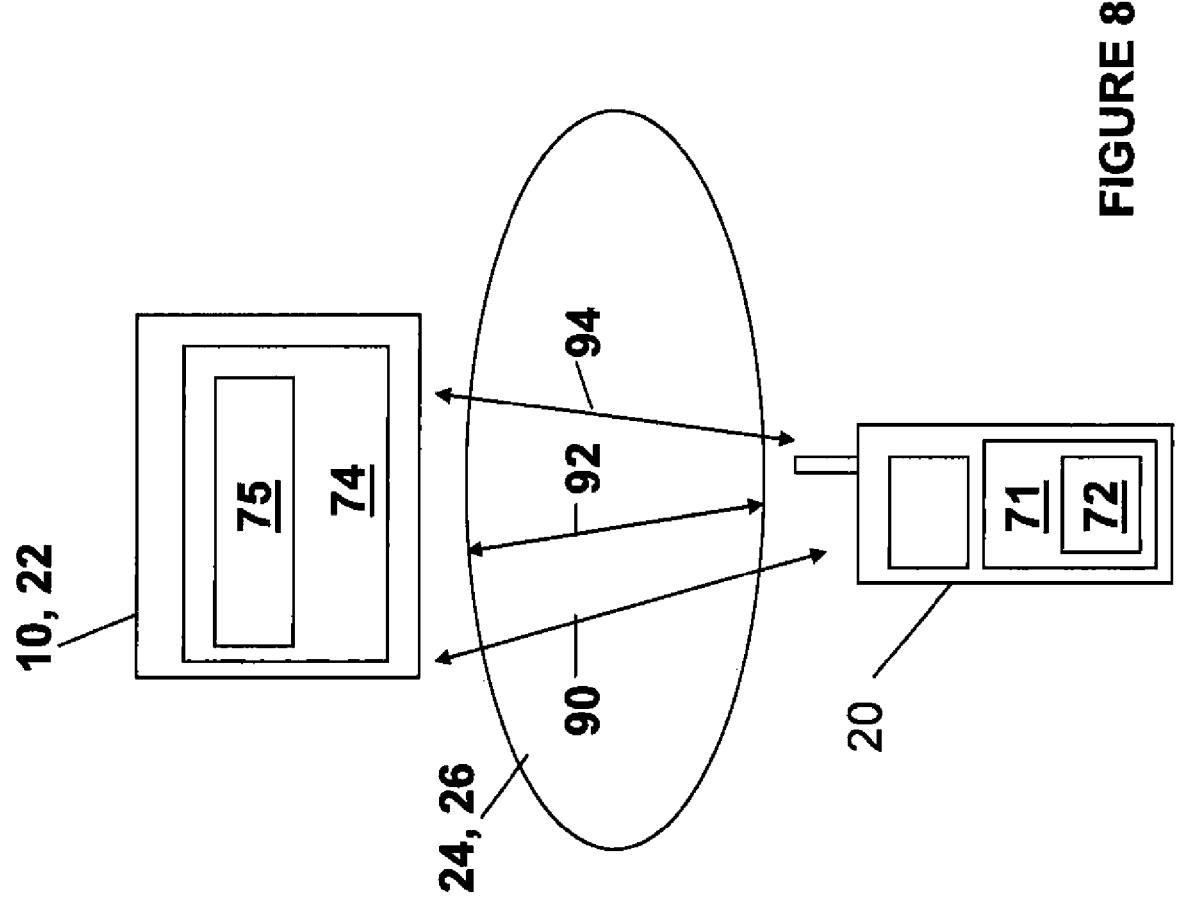
FIG. 8 illustrates a network aware mobile handset application of the content sharing system.

FIG. 8 illustrates a network aware mobile handset application of the content sharing system. As with the system shown in FIG. 5, the mobile handset 20 may include the content store 71, such as a database, that may include one or more playlists 72 and the computing device 10 may the content store 74, such as a database, and one or more pieces of content 75. The mobile handset may further include the content application that is executed on the mobile handset. In this embodiment of the system, the computing device 10 or device 22 may have one or more links 24, 26 that allows the mobile handset 20 to exchange data and information with the computing device 10 or device 22. The link, in this embodiment, may be one or more different links that each have different characteristics. For example, the links may be cellular/mobile or 3G network 90, a wireless computer network 92 and a Bluetooth network 94. Each of these link have different characteristics such as cost to use, bandwidth available and download speed and protocol. For example, a 3G network is expensive, requires a 3G enabled mobile device and has very fast download speeds, a wireless computer network may be free, require a WLAN card or circuit and has a slower download speed as compared to the 3G network.

In the network aware mobile handset application of the content sharing system, the application on the mobile handset has a behavior (when and how its uses each different link when available and how it synchronizes content with the computing device 10 or device 22) that changes based on the particular link that is available and accessible to the mobile handset. For example, the application on the mobile handset may be configured to download any and all content not already on the mobile handset automatically whenever the mobile handset can access a free link and also configured to only download the next piece of content as needed when the mobile handset has access only to an expensive link, such as 3G. As another example, the application on the mobile handset may have a dormancy timer to turn off network access to an expensive link until a button/user action reactivates the link access. As another example, the application on the mobile handset may disable any content prefetch when the mobile handset can only access an expensive link. As another example, if the user has selected to download a movie onto their mobile handset, the application may stream at a minimum speed when the mobile handset has access only to an expensive link, but may then download the entire movie onto the mobile handset when the mobile handset has access to a wireless computer network which is low cost or free. Thus, the application in the mobile handset has behaviors that change depending on the link access of the mobile handset.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A method for playing content of a user on a mobile handset, comprising:
   providing one or more pieces of content on the mobile handset; and
   performing content operations using a link aware application wherein the link aware application performs certain content operations when the mobile handset is connected by a particular link to a computing device,
   wherein performing content operations using the link aware application further comprises disabling a prefetch of content in a playlist on the mobile handset when the mobile handset has access to a particular link.

2. The method of claim 1, wherein performing content operations using a link aware application further comprises requesting a piece of content not stored on the mobile handset and downloading the piece of content when the mobile handset has access to a particular link.

3. The method of claim 2, wherein the particular link is a free link.

4. The method of claim 3, wherein the free link further comprises a wireless computer network.

5. The method of claim 1, wherein performing content operations using a link aware application further comprises requesting a next piece of content not stored on the mobile handset to be played and downloading the next piece of content only when the mobile handset has access to a particular link.

6. The method of claim 2, wherein the particular link is an expensive link.

7. The method of claim 6, wherein the expensive link further comprises a 3G network.

8. The method of claim 1, wherein the particular link is an expensive link.

9. The method of claim 8, wherein the expensive link further comprises a 3G network.

10. The method of claim 1 further comprising generating, on the mobile handset, a playlist wherein the playlist contains one or more pieces of content not stored on the mobile handset, the playlist being a list of one or more pieces of content that can be played on the mobile handset and downloading the one or more pieces of content not stored on the mobile handset onto the mobile handset.

11. The method of claim 10, wherein the playlist further comprises one or more pieces of content stored in the mobile handset.

12. The method of claim 10, wherein generating the playlist further comprises storing the playlist on the mobile handset and updating the stored playlist on the mobile handset when a piece of content on the playlist is removed, a piece of content is added to the playlist or an owner of the mobile handset no longer has rights to a piece of content.

13. The method of claim 10 further comprising synchronizing the playlist to a remote computing device.

14. A method for playing content of a user on a mobile handset, comprising:
providing one or more pieces of content on the mobile handset;
performing content operations using a link aware application wherein the link aware application performs certain content operations when the mobile handset is connected by a particular link to a computing device, and
wherein performing content operations using the link aware application further comprises downloading a piece of content at a minimum speed when the mobile handset is connected to a particular link and downloading the entire piece of content when the mobile handset is connected to a second link having a different characteristics than the particular link.

15. The method of claim 14, wherein the particular link is an expensive link and the second link is a free link.

16. The method of claim 15, wherein the expensive link further comprises a 3G network and the free link further comprises a wireless computer network.

17. The method of claim 14 further comprising generating, on the mobile handset, a playlist wherein the playlist contains one or more pieces of content not stored on the mobile handset, the playlist being a list of one or more pieces of content that can be played on the mobile handset and downloading the one or more pieces of content not stored on the mobile handset onto the mobile handset.

18. The method of claim 17, wherein the playlist further comprises one or more pieces of content stored in the mobile handset.

19. The method of claim 17, wherein generating the playlist further comprises storing the playlist on the mobile handset and updating the stored playlist on the mobile handset when a piece of content on the playlist is removed, a piece of content is added to the playlist or an owner of the mobile handset no longer has rights to a piece of content.

20. The method of claim 17 further comprising synchronizing the playlist to a remote computing device.

21. The method of claim 14, wherein performing content operations using a link aware application further comprises requesting a piece of content not stored on the mobile handset and downloading the piece of content when the mobile handset has access to a particular link.

22. The method of claim 21, wherein the particular link is a free link.

23. The method of claim 22, wherein the free link further comprises a wireless computer network.

24. The method of claim 14, wherein performing content operations using a link aware application further comprises requesting a next piece of content not stored on the mobile handset to be played and downloading the next piece of content only when the mobile handset has access to a particular link.

25. The method of claim 24, wherein the particular link is an expensive link.

26. The method of claim 25, wherein the expensive link further comprises a 3G network.

27. A system for sharing content of a user between a computer and a mobile handset, comprising:
a computer having a content store that stores a plurality of pieces of content of the user;
a mobile handset having a mobile handset content store that stores one or more pieces of content, the mobile handset having a display that displays the one or more pieces of content stored on the mobile handset and the plurality of pieces of content stored on the computer; and
the mobile handset having an application that performs content operations using a link aware application wherein the link aware application performs certain content operations when the mobile handset is connected by a particular link to a computing device, and
wherein the application disables a prefetch of content in a playlist on the mobile handset when the mobile handset has access to a particular link.

28. The system of claim 27, wherein the particular link is an expensive link.

29. The system of claim 28, wherein the expensive link further comprises a 3G network.

30. The system of claim 27, wherein the application requests a piece of content not stored on the mobile handset and downloads the piece of content when the mobile handset has access to a particular link.

31. The system of claim 30, wherein the particular link is a free link.

32. The system of claim 31, wherein the free link further comprises a wireless computer network.

33. The system of claim 27, wherein the application requests a next piece of content not stored on the mobile handset to be played and downloads the next piece of content only when the mobile handset has access to a particular link.

34. The system of claim 33, wherein the particular link is an expensive link.

35. The system of claim 34, wherein the expensive link further comprises a 3G network.

36. The system of claim 27, wherein the mobile handset further comprises one of a personal digital assistant, a mobile phone, a wireless email device and a handheld device with link connectivity.

37. The system of claim 27, wherein the mobile handset has an application that generates, on the mobile handset, a playlist wherein the playlist contains one or more pieces of content not stored on the mobile handset wherein the playlist is a list of one or more pieces of content that can be played on the mobile handset and downloads the one or more pieces of content not stored on the mobile handset onto the mobile handset.

38. The system of claim 37, wherein the playlist further comprises one or more pieces of content stored in the mobile handset.

39. The system of claim 37, wherein the application stores the playlist on the mobile handset and updates the stored playlist on the mobile handset when a piece of content on the playlist is removed, a piece of content is added to the playlist or an owner of the mobile handset no longer has rights to a piece of content.

40. The system of claim 37, wherein the mobile handset further comprises one of a personal digital assistant, a mobile phone, a wireless email device and a handheld device with link connectivity.

41. A system for sharing content of a user between a computer and a mobile handset, comprising:

a computer having a content store that stores a plurality of pieces of content of the user;

a mobile handset having a mobile handset content store that stores one or more pieces of content, the mobile handset having a display that displays the one or more pieces of content stored on the mobile handset and the plurality of pieces of content stored on the computer; and the mobile handset having an application that performs content operations using a link aware application wherein the link aware application performs certain content operations when the mobile handset is connected by a particular link to a computing device, and wherein the application downloads a piece of content at a minimum speed when the mobile handset is connected to a particular link and downloads the entire piece of content when the mobile handset is connected to a second link having a different characteristics than the particular link.

42. The system of claim 41, wherein the particular link is an expensive link and the second link is a free link.

43. The system of claim 42, wherein the expensive link further comprises a 3G network and the free link further comprises a wireless computer network.

44. The system of claim 41, wherein the mobile handset further comprises one of a personal digital assistant, a mobile phone, a wireless email device and a handheld device with link connectivity.

45. The system of claim 41, wherein the mobile handset has an application that generates, on the mobile handset, a playlist wherein the playlist contains one or more pieces of content not stored on the mobile handset wherein the playlist is a list of one or more pieces of content that can be played on the mobile handset and downloads the one or more pieces of content not stored on the mobile handset onto the mobile handset.

46. The system of claim 45, wherein the playlist further comprises one or more pieces of content stored in the mobile handset.

47. The system of claim 45, wherein the application stores the playlist on the mobile handset and updates the stored playlist on the mobile handset when a piece of content on the playlist is removed, a piece of content is added to the playlist or an owner of the mobile handset no longer has rights to a piece of content.

48. The system of claim 45, wherein the mobile handset further comprises one of a personal digital assistant, a mobile phone, a wireless email device and a handheld device with link connectivity.

49. The system of claim 41, wherein the application requests a piece of content not stored on the mobile handset and downloads the piece of content when the mobile handset has access to a particular link.

50. The system of claim 49, wherein the particular link is a free link.

51. The system of claim 50, wherein the free link further comprises a wireless computer network.

52. The system of claim 41, wherein the application requests a next piece of content not stored on the mobile handset to be played and downloads the next piece of content only when the mobile handset has access to a particular link.

53. The system of claim 52, wherein the particular link is an expensive link.

54. The system of claim 53, wherein the expensive link further comprises a 3G network.

* * * * *

UNITED STATES PATENT AND TRADEMARK OFFICE
CERTIFICATE OF CORRECTION

PATENT NO. : 7,865,572 B2
APPLICATION NO. : 12/355546
DATED : January 4, 2011
INVENTOR(S) : Edwin Ho and King Sun Wai It is certified that error appears in the above-identified patent and that said Letters Patent is hereby corrected as shown below:

Title Page, Item (75) Inventors
In section (75) Inventors: "King Sunit Wai" should read --King Sun Wai--

Signed and Sealed this
Third Day of May, 2011

David J. Kappos
*Director of the United States Patent and Trademark Office*